(12) United States Patent
Yang et al.

(10) Patent No.: US 11,449,121 B2
(45) Date of Patent: Sep. 20, 2022

(54) PRODUCT DETECTION DEVICE, PRODUCT DETECTION SYSTEM AND PRODUCT DETECTION METHOD APPLIED THERETO

(71) Applicant: Primax Electronics Ltd., Taipei (TW)

(72) Inventors: Shun-Fu Yang, Taipei (TW); Yi-Kang Chiu, Taipei (TW); Wei-Cheng Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 116 days.

(21) Appl. No.: 17/160,226

(22) Filed: Jan. 27, 2021

(65) Prior Publication Data

US 2022/0164017 A1 May 26, 2022

(30) Foreign Application Priority Data

Nov. 20, 2020 (TW) ................................ 109140848

(51) Int. Cl.
*G06F 1/3215* (2019.01)
*G06F 13/38* (2006.01)

(52) U.S. Cl.
CPC .......... *G06F 1/3215* (2013.01); *G06F 13/382* (2013.01); *G06F 2213/0042* (2013.01)

(58) Field of Classification Search
CPC .... G06F 1/3215; G06F 1/3218; G06F 1/3231; G06F 1/32; G06F 1/3206; G06F 2213/0042; G06F 2213/0044
See application file for complete search history.

(56) References Cited

U.S. PATENT DOCUMENTS

| 2004/0064273 A1* | 4/2004 | Le ........................... G06F 1/266 702/60 |
| 2017/0147526 A1* | 5/2017 | Chen .................... G06F 13/4068 |
| 2017/0370964 A1* | 12/2017 | Chen .................... G01R 1/0416 |
| 2019/0196924 A1* | 6/2019 | Gregg ................. G06F 13/4295 |

* cited by examiner

*Primary Examiner* — Raymond N Phan
(74) *Attorney, Agent, or Firm* — Kirton McConkie; Evan R. Witt

(57) ABSTRACT

The product detection system includes a computing device, at least one power detection instrument and a product detection device. The product detection device includes a processing unit, plural USB-C transmission ports and plural detection connection ports. A product detection method includes following steps. Firstly, at least one USB-C under-test product is connected with the plural USB-C transmission ports, and the at least one power detection instrument is connected with the plural detection connection ports. Then, the USB-C transmission port is set as a first role or a second role. Then, the USB-C transmission port corresponding to the first role is cyclically operated at plural designated voltages under control of the processing unit, and the processing unit issues an output voltage to the USB-C transmission port corresponding to the second role. Then, an operation status of the USB-C under-test product is detected.

20 Claims, 4 Drawing Sheets

PRODUCT DETECTION DEVICE, PRODUCT DETECTION SYSTEM AND PRODUCT DETECTION METHOD APPLIED THERETO

FIELD OF THE INVENTION

The present invention relates to a product detection device, a product detection system and a product detection method, and more particularly to a product detection device, a product detection system and a product detection method using plural transmission ports for simultaneously and automatically detecting plural under-test products.

BACKGROUND OF THE INVENTION

A universal serial bus (USB) is a specification or a standard interface for connecting a computer and an external device as well as a technical specification about a power or signal input/output interface. According to the hardware appearance, the USB connectors or transmission interfaces are classified into three types, including a USB Type-A connector, a USB Type-B connector and a USB Type-C (or USB-C) connector. The main difference between the Type-C connector and the Type-A and Type-B connectors is that the upper layer and the lower layer of the Type-C connector are identical. That is, the front and back of the USB-C connector are the same.

Moreover, USB Power Delivery (abbreviated as USB PD) is a charging protocol or standard for USB and published by the USB Developer Forum. The USB PD technology is also a fast charging technology. At present, the latest version of USB-C PD is the 3.0 version that is aimed at the Type-C transmission interface.

As known, the maximum power supply of the standard USB 2.0 interface is 2.5 watts (W), the maximum power supply of the standard USB 3.0 is 4.5 watts (W), and the maximum power supply of the USB battery charging (BC) interface is 7.5 watts (W). In contrast, when the USB-C interface is applied to the USB power delivery technology, the power supply is in the range between 15 and 100 watts (W). Consequently, the high-power electronic devices such as notebook computers or flat-screen TVs may be powered through the Type-C power cords.

The peripheral electronic products that can support the USB-C PD technology can be operated under relatively high voltage or high current conditions. Consequently, these products may face many technical issues about the power charging mechanism, the compatibility, the safety mechanism or the protection mechanism design. In other words, it is important to test these products in the production line before they leave the factory. For example, production line testing items for the USB-C PD product include an overcurrent protection (OCP) item, an overvoltage protection (OVP) item, an undervoltage protection (UVP) item, and so on.

However, the instrument for the conventional USB-C PD detection technology is only able to test a device under test (DUT) at a time. Moreover, since the inspector manually switches or regulates voltage/current and observes the process and results visually, this method is time-consuming and labor-intensive and readily causes problems such as misjudgment.

Therefore, it is important for the developers or the industries to provide a detection system for simultaneously detecting plural devices under test in the production line.

SUMMARY OF THE INVENTION

The present invention provides a product detection device, a product detection system and a product detection method. In the product detection device, the product detection system and the product detection method, plural transmission ports are used to simultaneously and automatically detect plural under-test products while effectively reducing the detecting time and reducing possible errors of manual detection.

In accordance with an aspect of the present invention, a product detection device is used between a computing device, at least one power detection instrument and at least one USB-C under-test product. A detection program is loaded in the computing device. The product detection device includes a circuit board, a processing unit, plural USB-C transmission ports and plural detection connection ports. The processing unit is installed on the circuit board. The plural USB-C transmission ports are installed on the circuit board, and connectable with the at least one USB-C under-test product. The plural detection connection ports are installed on the circuit board, and connectable with the at least one power detection instrument. The plural detection connection ports are correlated with the plural USB-C transmission ports. The detection program issues a detection command. The USB-C transmission port connected with the USB-C under-test product is set as a first role or a second role. The USB-C transmission port corresponding to the first role is cyclically operated at plural designated voltages under control of the processing unit. The processing unit issues an output voltage to the USB-C transmission port corresponding to the second role. An operation status of the USB-C under-test product corresponding to the USB-C transmission port is detected by the connected power detection instrument.

In accordance with another aspect of the present invention, a product detection system is provided for detecting at least one USB-C under-test product. The product detection system includes a computing device, at least one power detection instrument and a product detection device. A detection program is loaded in the computing device. The product detection device includes a circuit board, a processing unit, plural USB-C transmission ports and plural detection connection ports. The processing unit is installed on the circuit board. The plural USB-C transmission ports are installed on the circuit board, and connectable with the at least one USB-C under-test product. The plural detection connection ports are installed on the circuit board, and connectable with the at least one power detection instrument. The plural detection connection ports are correlated with the plural USB-C transmission ports. The detection program issues a detection command. The USB-C transmission port connected with the USB-C under-test product is set as a first role or a second role. The USB-C transmission port corresponding to the first role is cyclically operated at plural designated voltages under control of the processing unit. The processing unit issues an output voltage to the USB-C transmission port corresponding to the second role. An operation status of the USB-C under-test product corresponding to the USB-C transmission port is detected by the connected power detection instrument.

In accordance with a further aspect of the present invention, a product detection method is used in a product detection system to detect at least one USB-C under-test product. The product detection system includes a computing device, at least one power detection instrument and a product detection device. A detection program is loaded in the computing device. The product detection device includes a processing unit, plural USB-C transmission ports and plural detection connection ports. The plural detection connection ports are correlated with the plural USB-C transmission ports. The product detection method includes the following steps. Firstly, the at least one USB-C under-test product is connected with the plural USB-C transmission ports, and the at least one power detection instrument is connected with the plural detection connection ports. Then, the detection program issues a detection command. The processing unit checks the connection statuses of the plural USB-C transmission ports. Then, the USB-C transmission port that is connected with the USB-C under-test product is set as a first role or a second role. Then, the USB-C transmission port corresponding to the first role is cyclically operated at plural designated voltages under control of the processing unit, and the processing unit issues an output voltage to the USB-C transmission port corresponding to the second role. Then, an operation status of the USB-C under-test product corresponding to the USB-C transmission port is detected by the connected power detection instrument.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a product detection device, a product detection system and a product detection method. A first embodiment will be described as follows.

Figure 1A:
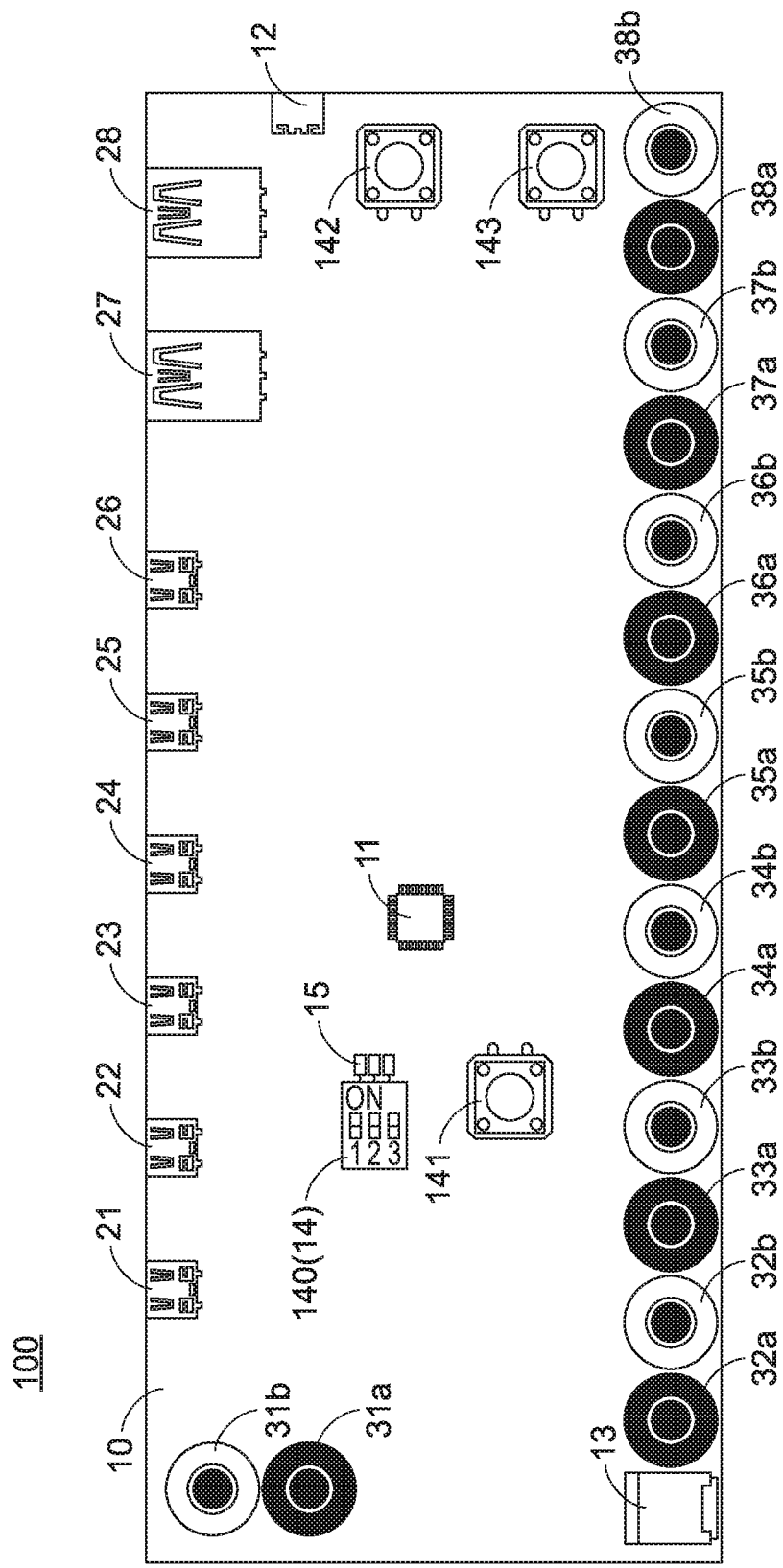
FIG. 1A schematically illustrates the layout structure of a product detection device according to an embodiment of the present invention.
Figure 1B:
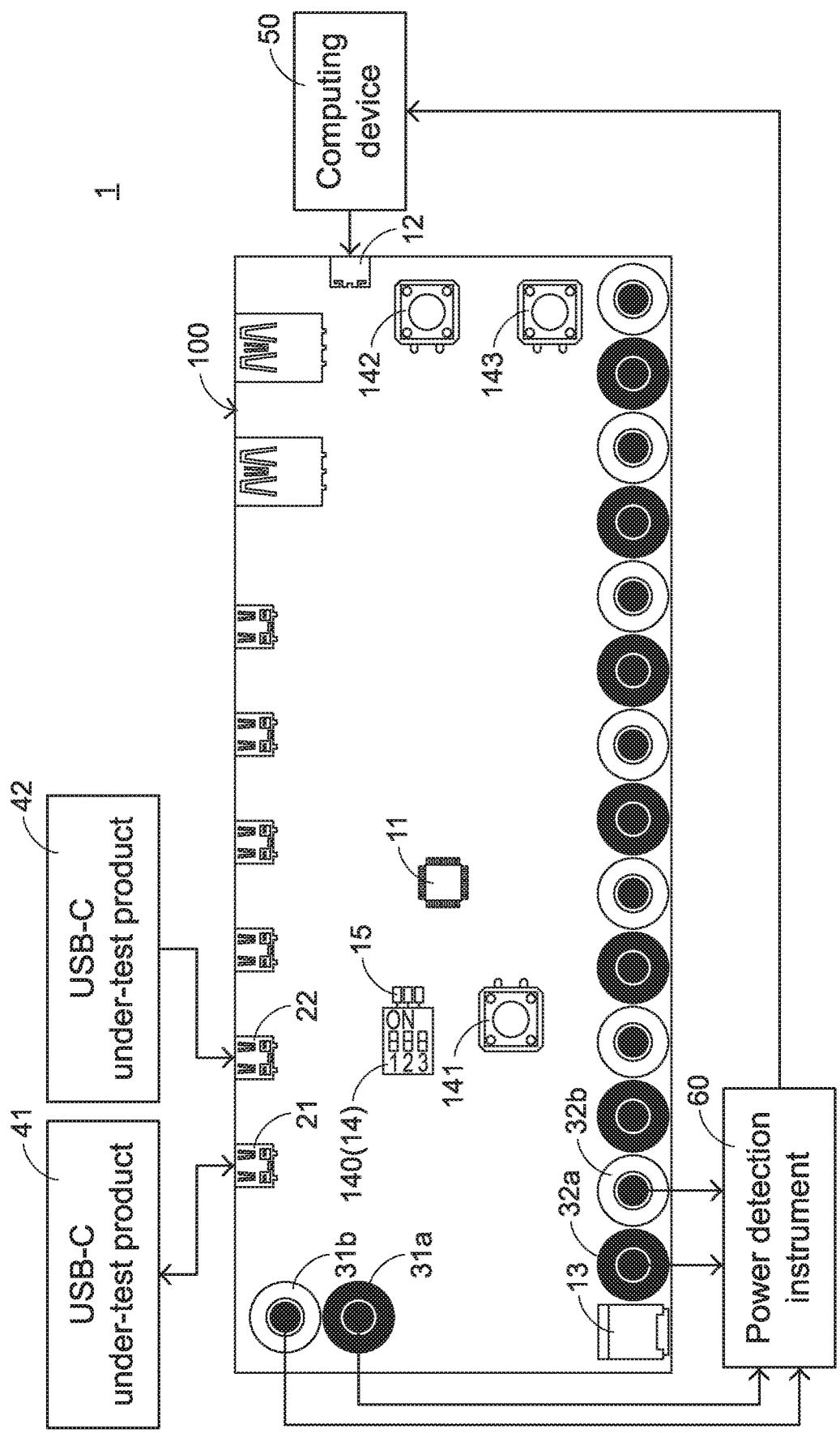
FIG. 1B schematically illustrates a product detection system for USB-C detection according to a first embodiment of the present invention.

Please refer to FIGS. 1A and 1B. FIG. 1A schematically illustrates the layout structure of a product detection device according to an embodiment of the present invention. FIG. 1B schematically illustrates a product detection system for USB-C detection according to a first embodiment of the present invention. As shown in FIGS. 1A and 1B, the product detection system 1 mainly comprises a computing device 50, a power detection instrument 60 and a product detection device 100.

The product detection device 100 mainly comprises a circuit board 10, a processing unit 11, plural USB-C transmission ports 21~26 and plural detection connection ports 31a~38b. The processing unit 11, the plural USB-C transmission ports 21~26 and the plural detection connection ports 31a~38b are installed on the circuit board 10.

The product detection device 100 and the product detection system 1 are used for detecting plural devices under test (DUT), which are also referred as under-test products. Especially, the devices under test or under-test products are USB-C (or Type-C) electronic products. In the embodiment of FIGS. 1A and 1B, six USB-C transmission ports 21~26 are shown. In addition, the product detection system 1 is used for detecting two USB-C under-test products 41 and 42. For example, the USB-C under-test products 41 and 42 are connected with the corresponding USB-C transmission ports 21 and 22, respectively. In case that the USB-C under-test product has a single input/output port, the product detection device 100 can detect six such USB-C under-test product at most. Alternatively, the product detection device 100 may detect one of these USB-C under-test products according to the practical requirements.

The plural detection connection ports 31a~38b are connectable with the power detection instrument 60. In addition, the plural detection connection ports 31a~38b are correlated with the USB-C transmission ports 21~26. That is, each USB-C transmission port is correlated with a group of two detection connection ports (e.g., a V+ terminal and a GND terminal). For example, the USB-C transmission port 21 is correlated with the two detection connection ports 31a and 31b, and the USB-C transmission port 22 is correlated with the two detection connection ports 32a and 32b. The power detection instrument 60 is connected with the corresponding detection connection ports through four transmission lines. As mentioned above, the USB-C under-test products 41 and 42 are connected with the USB-C transmission ports 21 and 22. Consequently, the first terminals of the four transmission lines are connected with the detection connection ports 31a, 31b, 32a and 32b corresponding to the USB-C transmission ports 21 and 22, and the second terminals of the four transmission lines are connected with the power detection instrument 60.

The conventional detection device is suitably used as the power detection instrument 60. The power detection instrument 60 is mainly used to detect the input/output power (W) of the devices under test (DUT). Optionally, the power detection instrument 60 is designed to have plural detection channels (CH), e.g., six detection channels. For example, according to the layout structure of FIG. 1B, a single power detection instrument 60 can be used for simultaneously detecting six USB-C under-test products. It is noted that numerous modifications and alterations may be made while retaining the teachings of the invention. For example, in another embodiment, the power detection instrument only has a single detection channel. Under this circumstance, the product detection device 100 needs to be connected with plural power detection instruments for performing the detecting tasks.

Please refer to FIGS. 1A and 1B again. In this embodiment, a total of sixteen detection connection ports 31a~38b (i.e., in eight groups) are shown. The product detection device 100 further comprises plural (e.g., two) Type-A transmission ports 27 and 28. The Type-A transmission ports 27 and 28 are installed on the circuit board 10. The Type-A transmission port 27 is correlated with a group of two detection connection ports 37a and 37b. The Type-A transmission port 28 is correlated with a group of two detection connection ports 38a and 38b. The Type-A transmission ports 27 and 28 as shown in FIGS. 1A and 1B are connectable with one or two Type-A under-test products. In other words, the detection connection ports 31a~38b are correlated with the USB-C transmission ports 21~26 and the Type-A transmission ports 27~28. The method of detecting the Type-A under-test products will be described later.

The product detection device 100 further comprises a back-end connection interface 12. The back-end connection interface 12 is installed on the circuit board 10. In an embodiment, the back-end connection interface 12 is a USB interface that is connected with the computing device 50 through a corresponding transmission line. Similarly, the conventional computer can be used as the computing device 50. For example, the computing device 50 is a notebook computer or a desktop computer. A detection program is loaded in the computing device 50 for allowing the user or the inspector to control the detecting task and observe the detection results. Moreover, when the detection program is executed, a window-based interface is shown. The product detection device 100 can be instructed to operate the product detection method of the present invention through the window-based interface.

In an embodiment, the processing unit 11 is equipped with a firmware component to execute the product detection method. Alternatively, the procedures of the product detection method are stored as operation program codes. The operation program codes are stored in a flash memory (not shown) that is electrically connected with the processing unit 11 and directly executed by the processing unit 11. Particularly, some hardware units that are correlated with the USB-C transmission ports and support the USB-C PD communication protocol are installed on the circuit board 10. For example, the hardware units include Type-C port controllers (TCPC) that are configured to control the USB-C transmission ports 21~26.

In an embodiment, the processing unit 11 is a microcontroller (MCU) that is designed according to a Type-C port manager (TCPM) software technology. Especially, the programming and encoding capabilities of the processing unit 11 are designed to support the functions of detecting plural USB-C under-test products or managing plural ports according to the USB-C PD communication protocol. The Type-C port controllers are not shown in FIGS. 1A and 1B. However, it is known that each of the Type-C port controllers is electrically connected between the corresponding one of the USB-C transmission ports 21~26 and the processing unit 11.

In accordance with a feature of the present invention, the plural USB-C transmission ports are provided to simultaneously detect plural USB-C under-test products. In accordance with another feature of the present invention, some of the USB-C transmission ports have a dual-role power (DRP) capability. Particularly, the USB-C (or Type-C) device can be operated as a sink or a source or DRP. For detection, in case that the role of the USB-C device (e.g., the USB-C under-test product) is the sink, the current of the USB-C device is drawn to the system (e.g., the product detection device). For detection, in case that the role of the USB-C device (e.g., the USB-C under-test product) is the source, the system (e.g., the product detection device) provides power to the USB-C device or charges the USB-C device. In an embodiment, the first USB-C transmission port 21 and the fourth USB-C transmission port 24 have the DRP capability, and the other four USB-C transmission ports 22, 23, 25 and 26 are operated only as sinks.

Figure 2:
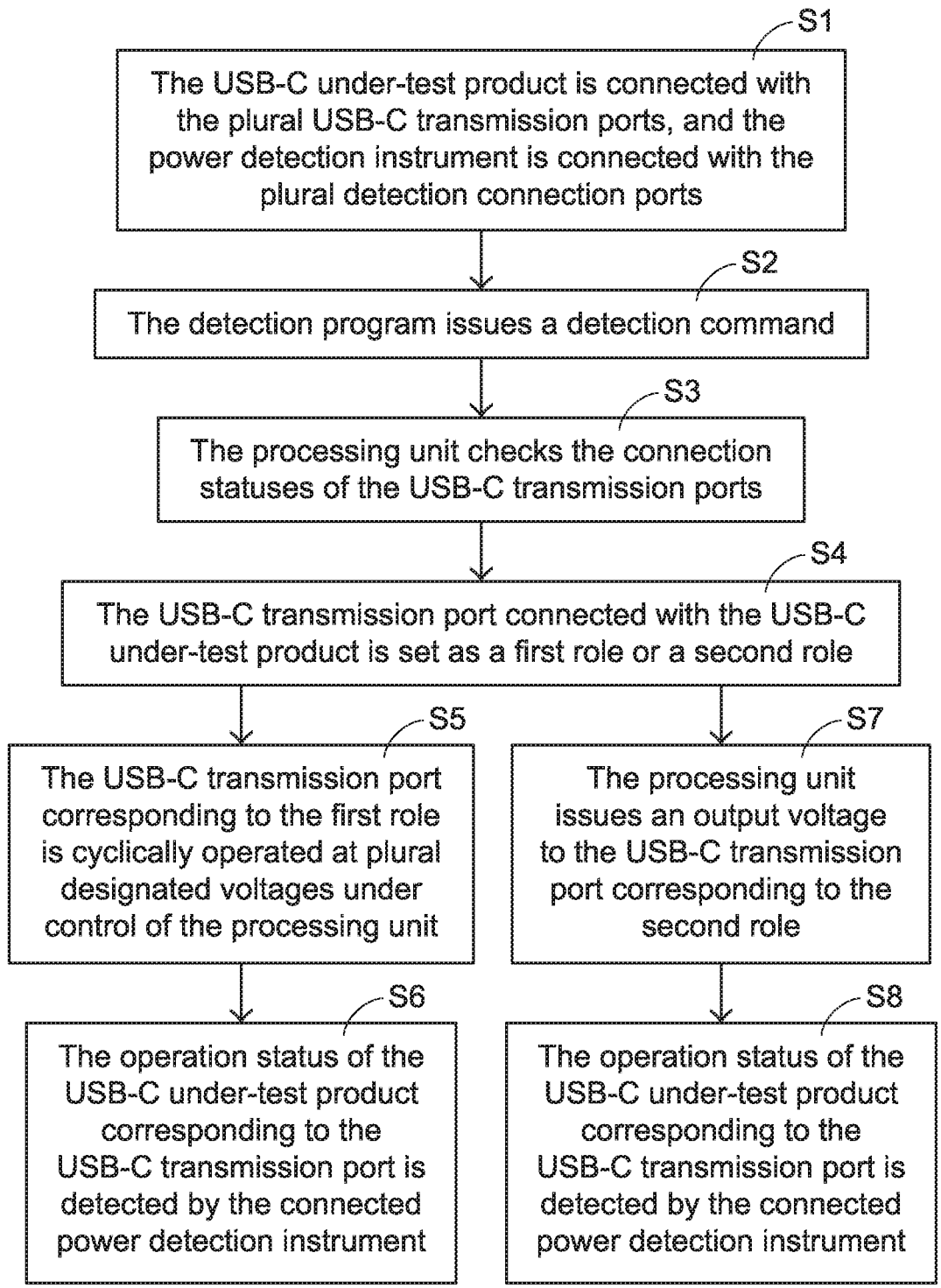
FIG. 2 is a flowchart illustrating a product detection method according to an embodiment of the present invention.

FIG. 2 is a flowchart illustrating a product detection method according to an embodiment of the present invention. Firstly, at least one USB-C under-test product is connected with the plural USB-C transmission ports, and at least one power detection instrument is connected with the plural detection connection ports (Step S1). Then, the detection program issues a detection command (Step S2). Then, the processing unit checks the connection statuses of the USB-C transmission ports (Step S3). Then, the USB-C transmission port connected with the USB-C under-test product is set as a first role or a second role (Step S4). Then, the USB-C transmission port corresponding to the first role is cyclically operated at plural designated voltages under control of the processing unit (Step S5), or the processing unit issues an output voltage to the USB-C transmission port corresponding to the second role (Step S7). Afterward, the operation status of the USB-C under-test product corresponding to the USB-C transmission port is detected by the connected power detection instrument (Steps S6 and S8).

In the stage of the step S1, the product detection system 1 is in an initial status and ready for detection. In the initial status, the USB-C transmission ports 21~26 have not been connected with any USB-C under-test product, and the detection connection ports 31a~38b have not been connected with any power detection instrument. The way of connecting the USB-C under-test product with the USB-C transmission ports 21~26 is determined according to the design of the input/output port of the USB-C under-test product. For example, one under-test product is connected with one transmission port, or one under-test product is connected with plural transmission ports.

Similarly, the way of connecting the power detection instrument 60 with the detection connection ports 31a~38b is determined according to the number of the detection channels of the power detection instrument 60, the number of the USB-C under-test product and the number of the input/output ports of the USB-C under-test product. After the power detection instrument 60 is connected with the detection connection ports 31a~38b, the power detection instrument 60 needs to be connected with an external power source to be enabled.

In the step S2, the user can execute the detection program on the computing device 50 and perform associated detection control operations through the window-based interface shown on the computing device 50. Especially, the product detection method of the present invention can be automatically executed. When the detection program is executed to issue a detection command to the product detection device 100, the processing unit 11 receives the detection command and starts to execute the corresponding operation program codes for detection. The purpose of designing the detection program is to monitor the USB-C transmission ports 21~26. Since the USB-C transmission ports 21~26 are operated according to the USB-C PD communication protocol, the detection program has to issue to the detection command according to the USB-C PD communication protocol.

In the step S3, the processing unit 11 checks the USB-C transmission ports 21~26 sequentially so as to realize which transmission ports are connected. In this stage, the USB-C transmission ports 21 and 22 have been connected with the USB-C under-test products 41 and 42. Consequently, the processing unit 11 realizes which transmission ports need to be detected subsequently. In other words, this stage is also a judging procedure. For example, the processing unit 11 can check whether each of the plural transmission ports is connected or not. If any of the plural transmission ports is connected, the next step is performed. If none of the plural transmission ports are connected, the checking procedure is repeatedly done.

In the step S4, if the USB-C transmission ports 21 and 22 are set as the first role, the USB-C under-test products 41 and 42 connected to the corresponding USB-C transmission ports 21 and 22 provide electric power to the circuit board 10. That is, the first role is operated as a sink. In an embodiment, all of the USB-C transmission ports 21~26 are set to be operable as the first role. In other words, if the product detection device 100 is used to detect the operation of the USB-C under-test product 41 or 42 corresponding to the first role (i.e., the sink) of the USB-C transmission ports 21~26, the USB-C under-test product 41 or 42 can be connected with any of the USB-C transmission ports 21~26. If the USB-C transmission port 21 connected to the USB-C under-test product 41 is set as the second role, the circuit board 10 or an external power source (not shown) provides electric power to the connected USB-C under-test product 41. That is, the second role is operated as a source.

As mentioned above, at least one of the USB-C transmission ports is set to be operable as the second role. In an embodiment, the first USB-C transmission port 21 and the fourth USB-C transmission port 24 can be operated as the second role. That is, the first USB-C transmission port 21 and the fourth USB-C transmission port 24 have the DRP capability. The other four USB-C transmission ports 22, 23, 25 and 26 are operable as the sink (i.e., the first role) only. In other words, if the product detection device is used to detect the operation of the USB-C under-test product corresponding to the second role (i.e., the source) of the USB-C transmission port, the USB-C under-test product needs to be connected with the first USB-C transmission port 21 or the fourth USB-C transmission port 24.

In the step S4, the procedures of setting the roles of the USB-C transmission ports 22, 23, 25 and 26 may be implemented by the user because these transmission ports cannot be operated as the source. Whenever the under-test products are connected with these transmission ports, it is confirmed that these transmission ports are operated as the sink. However, when the under-test product is connected with the first USB-C transmission port 21 or the fourth USB-C transmission port 24, the first USB-C transmission port 21 or the fourth USB-C transmission port 24 may be operated as the sink or the source. In this step, the role of the first USB-C transmission port 21 or the fourth USB-C transmission port 24 is determined according to the USB-C PD communication protocol. That is, the role of the first USB-C transmission port 21 or the fourth USB-C transmission port 24 is set as the sink or the source in this detection according to the practical requirements.

Please refer to the steps S5 and S6 of the flowchart. Nowadays, the standard Type-C transmission line power supply under the USB-C PD communication protocol can support plural voltages, i.e., the designated voltages. For example, the designated voltages include 5 Volts (V), 9 Volts (V), 12 Volts (V), 15 Volts (V) and 20 Volts (V). In accordance with a feature of the present invention, the USB-C transmission ports 21 and 22 corresponding to the first role (i.e., the sink) are sequentially and cyclically operated at plural designated voltages under control of the processing unit 11. Consequently, the USB-C transmission ports 21 and 22 draw currents from the USB-C under-test products 41 and 42 at the different designated voltages, and the power detection instrument 60 acquires the loading capacities of the corresponding USB-C under-test products 41 and 42.

According to current technology, the rated loading capacity of a standard Type-C transmission line is 3 amperes (A). In an embodiment, the power detection instrument 60 draws the currents of 3 A or 4.25 A from the USB-C under-test products 41 and 42 at the cyclic designed voltages.

For example, when the product detection method is used to detect the USB-C under-test products 41 and 42 as shown in FIG. 1B, the processing unit 11 controls the transmission ports 21 and 22 to be operated at the designated voltages sequentially. That is, the transmission port 21 is operated at 5V, the transmission port 22 is operated at 5V, the transmission port 21 is operated at 9V, the transmission port 22 is operated at 9V, the transmission port 21 is operated at 12V, the transmission port 22 is operated at 12V, the transmission port 21 is operated at 15V, the transmission port 22 is operated at 15V, the transmission port 21 is operated at 20V, and the transmission port 22 is operated at 20V. Moreover, the above procedures according to the specified sequence can be automatically and cyclically performed under the processing unit 11. Especially, the number of repeatedly performing the above procedures may be set by the processing unit 11. Consequently, the detection results are more accurate through the repetitive detection. Of course, if more USB-C transmission ports are connected with the corresponding USB-C under-test products, these USB-C transmission ports are cyclically operated at the designated voltages according to the above sequence.

In an embodiment, the power detection instrument 60 also comprises an operation interface and a display unit. The operation interface can be operated by the user. The information detected by the detection channels (e.g., voltages, currents or operation power) can be shown on the display unit. Moreover, the computing device 50 is in communication with the power detection instrument 60 through another transmission line. Consequently, the detection results about the USB-C under-test products 41 and 42 can be simultaneously transmitted from the power detection instrument 60 to the computing device 50. In addition, the detection results can be viewed by the user through the window-based interface corresponding to the detection program. Moreover, if the number of the under-test products is larger or the number of repeatedly performing the above procedures is increased, the detection program running in the computing device 50 may be designed to automatically manage and calculate the received data. That is, it is not necessary for the user to take a lot of time to process the data.

The procedures of the steps S7 and S8 are similar to those of the steps S5 and S6. However, in the steps S7 and S8, the USB-C transmission ports are operated as the second role (i.e., the source). For example, when the product detection method is applied to the product detection system of FIG. 1B, the USB-C transmission port 21 with the DRP capability is feasible. Moreover, as shown in FIGS. 1A and 1B, a power socket 13 to be connected with a power cord adapter is installed on the circuit board 10. Consequently, the electric power can be transmitted from the external power source (not shown) to the circuit board 10 through the power cord. Since the USB-C transmission port 21 is operated as the second role, the electric power can be supplied to the USB-C under-test product 41 that is connected with the USB-C transmission port 21.

In an embodiment, the external power source is operated at 65 watts (W), and the power detection instrument 60 draws the currents of 3 A or 1.5 A from the USB-C under-test product 41 in order to detect the power supply capacity. It is noted that the product detection device 100 (including the processing unit 11) is also powered by the external power source. When the USB-C transmission port 21 is operated as the second role (i.e., the source), the procedure of detecting the operation of the USB-C under-test product 41 needs to issue the output voltage to the USB-C transmission port 21 and acquire the current through the power detection instrument 60. Consequently, the associated signals as shown in FIG. 1B are transmitted in a bidirectional manner.

As mentioned above, the detecting procedure corresponding to the first role and the detecting procedure corresponding to the second role cannot be simultaneously performed.

Since the first USB-C transmission port 21 and the fourth USB-C transmission port 24 have the DRP capability, the detecting tasks corresponding to these transmission ports should be specially managed. For example, when the product detection method is applied to the product detection system of FIG. 1B, the USB-C transmission ports 21 and 22 are firstly operated as the first role. After the detection procedure corresponding to the first role is completed, the USB-C transmission port 21 is operated as the second role and subjected to the detection procedure.

It is noted that there is no certain sequence relationship between the detection procedure of the steps S5~S6 corresponding to the first role and the detection procedure of the steps S7~S8 corresponding to the second role. That is, the user may determine whether the detection procedure corresponding to the first role or the detection procedure corresponding to the second role is firstly performed. Alternatively, according to the settings of the processing unit 11, the detection procedure corresponding to the second role is automatically performed after the detection procedure corresponding to the first role is completed.

Moreover, as shown in FIG. 1B, the product detection device 100 further comprises a manual operation module 14 and a display module 15. The manual operation module 14 and the display module 15 are installed on the circuit board 10. The detection procedure can be manually performed by the user through the manual operation module 14. The detection results of using the manual operation module 14 can be shown and indicated on the display module 15. In addition, the detection results of the detection procedures in response to the detection command can be shown and indicated on the display module 15.

In an embodiment, the manual operation module 14 comprises a switching element 140. The switching element 140 can be triggered by the user. Moreover, the switching element 140 comprises plural switches corresponding to the USB-C transmission ports 21 and 24. Through the switching element 140, the user can determine whether the second role or the DRP function of the USB-C transmission port 21 or 24 is enabled or not. In some embodiments, the manual operation module 14 comprises plural keys 141, 142 and 143, which can be pressed down by the user. Through the plural keys 141, 142 and 143, the transmission ports can be operated at the designated voltages. The display module 15 comprises plural LED units. The results of the manual operation or the automatic detection can be realized according to the light color or the flickering conditions of the LED units.

In this embodiment, the manual operation module 14 comprises the switching element 140 and the plural keys 141, 142 and 143. That is, the manual operation module 14 comprises two type of hardware components. The manual operation module 14 and the display module 15 are electrically connected with the processing unit 11. Consequently, the results about the user's setting or control can be transmitted from the manual operation module 14 and the display module 15 to the processing unit 11, or the manual operation module 14 and the display module 15 can receive the message from the processing unit 11.

Figure 3:
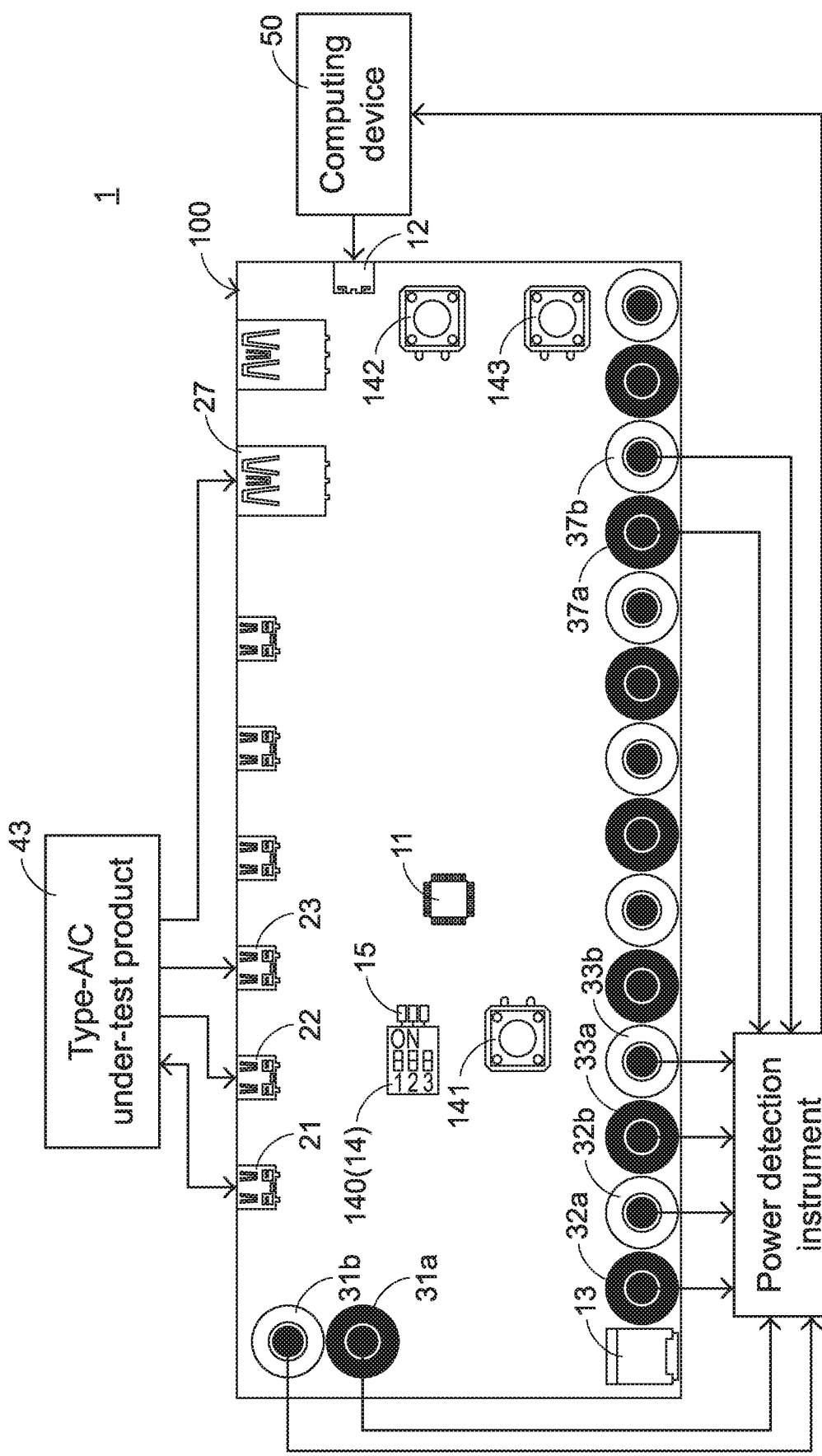
FIG. 3 schematically illustrates a product detection system for USB-C and Type-A detection according to a second embodiment of the present invention.

A second embodiment of the present invention will be described as follows. FIG. 3 schematically illustrates a product detection system for USB-C and Type-A detection according to a second embodiment of the present invention. In comparison with the first embodiment, the product detection device 100 and the product detection system 1 of the second embodiment as shown in FIG. 3 are configured to detect a Type-A/C under-test product 43. The Type-A/C under-test product 43 has a USB-C (or Type-C) transmission interface and a Type-A transmission interface. According to the current technology, the Type-A/C under-test product 43 is usually equipped with more than one input/output port. For example, the Type-A/C under-test product 43 is a docking station, a USB adapter/hub, a multi-port USB power adapter, or the like.

As mentioned above in the first embodiment, the product detection device 100 further comprises two Type-A transmission ports 27 and 28. When the Type-A transmission ports 27 and 28 are connected with the Type-A under-test product, the Type-A under-test product can be detected. It is noted that the product detection device 100 is further equipped with two multiplexers (MUX) corresponding to the Type-A transmission ports 27 and 28, respectively. The multiplexers are installed on the circuit board 10. By the multiplexers, the Type-A transmission port 27 or the Type-A transmission port 28 is selected or switched to output the corresponding signal. The multiplexers are electrically connected between the Type-A transmission ports 27 and 28 and the processing unit 11, respectively.

In an embodiment, the Type-A/C under-test product 43 has four input/output ports. Three of the four input/output ports are USB-C input/output ports, and one of the four input/output ports is a Type-A input/output port. The three USB-C input/output ports are operated at the power levels of 15 watts (W), 18 watts (W) and 85 watts (W), respectively. The Type-A input/output port is operated at the power level of 7.5 watts (W), for example operated at 5V/1.5 A. The Type-A transmission ports 27 and 28 can be used for the loading or power detection according to the USB battery charging (BC) specification, especially the USB battery charging (BC) version 1.2 specification.

As mentioned above, the Type-A/C under-test product 43 has three USB-C input/output ports and one Type-A input/output port. Consequently, the Type-A/C under-test product 43 is connected with the first USB-C transmission port 21, the second USB-C transmission port 22 and the third USB-C transmission port 23 of the product detection device 100 through three transmission lines, and the Type-A/C under-test product 43 is connected with the Type-A transmission port 27 through another transmission line. The power detection instrument 60 has plural detection channels. Consequently, the power detection instrument 60 is connected with the detection connection ports 31a, 31b, 32a, 32b, 33a, 33b, 37a and 37b corresponding to the USB-C transmission ports 21, 22, 23 and the Type-A transmission port 27 through eight transmission lines.

When the power detection instrument 60 is used to detect the Type-A/C under-test product 43 in the first role (i.e., a sink) or the second role (i.e., a source), the processing unit 11 checks the connection statuses of the Type-A transmission ports 27 and 28. Moreover, the power detection instrument 60 is designed to detect the operation status of the Type-A/C under-test product 43 connected to the Type-A transmission port 27 according to the USB battery charging (BC) specification. Particularly, the power detection instrument 60 can use the USB D+/D− switchable voltage division identification technology to detect voltage or current items. In addition, the power detection instrument 60 can be set to draw the current of 3 A, 1.5 A or 4.25 A from the Type-A/C under-test product 43.

In this embodiment, the USB-C detection procedure and the Type-A detection procedure of the Type-A/C under-test product 43 are simultaneously performed. It is noted that the concepts can be applied to detect plural products, for example three USB-C under-test products and one Type-A under-test product. As shown in FIG. 1B and FIG. 3, the product detection device 100 can be configured to detect six USB-C under-test products and two Type-A under-test products at most. In addition to the USB battery charging (BC) version 1.2 specification, the detection of the Type-A under-test product also complies with the Apple 2.1 A standard.

From the above descriptions, the present invention provides a product detection device, a product detection system and a product detection method. In comparison with the conventional technologies, the technology of the present invention has the following advantages. Firstly, the technology of the present invention is capable of simultaneously detecting plural devices under test (DUT) or under-test products (including USB-C and Type-A under-test products). Moreover, the automatic detection through the program codes can effectively reduce the detecting time and reduce possible errors of manual detection. Secondly, the technology of the present invention can be used for the sink detection, the source detection and the DRP detection. Consequently, the present invention provides a complete power detection platform for the products that support the USB-C PD communication protocol. Thirdly, because of the automatic control design of the present invention, the processing unit can perform a large number of operation control cycles with plural different designated voltages. The conventional technology of frequently plugging/unplugging the transmission line connector into/from the transmission port cannot achieve this purpose.

In other words, the product detection device, the product detection system and the product detection method of the present invention can overcome the drawbacks of the conventional technologies while achieving the objects of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A product detection device for use between a computing device, at least one power detection instrument and at least one USB-C under-test product, a detection program being loaded in the computing device, the product detection device comprising:
a circuit board;
a processing unit installed on the circuit board;
plural USB-C transmission ports installed on the circuit board, and connectable with the at least one USB-C under-test product; and
plural detection connection ports installed on the circuit board, and connectable with the at least one power detection instrument, wherein the plural detection connection ports are correlated with the plural USB-C transmission ports,
wherein the detection program issues a detection command, and the USB-C transmission port connected with the USB-C under-test product is set as a first role or a second role, wherein the USB-C transmission port corresponding to the first role is cyclically operated at plural designated voltages under control of the processing unit, the processing unit issues an output voltage to the USB-C transmission port corresponding to the second role, and an operation status of the USB-C under-test product corresponding to the USB-C transmission port is detected by the connected power detection instrument.

2. The product detection device according to claim 1, wherein the product detection device further comprises plural Type-A transmission ports, which are installed on the circuit board and connectable with at least one Type-A under-test product, wherein the plural detection connection ports are correlated with the plural USB-C transmission ports and the plural Type-A transmission ports.

3. The product detection device according to claim 2, wherein an operation status of the Type-A under-test product corresponding to the Type-A transmission port is detected by the connected power detection instrument according to a USB battery charging (BC) specification.

4. The product detection device according to claim 1, further comprising:
a back-end connection interface installed on the circuit board, wherein the back-end connection interface is connected with the computing device;
a manual operation module installed on the circuit board, wherein a detection procedure is manually performed by a user through the manual operation module; and
a display module installed on the circuit board, wherein a detection result of using the manual operation module or a detection result in response to the detection command is shown and indicated on the display module.

5. The product detection device according to claim 1, wherein if the USB-C transmission port connected with the USB-C under-test product is set as the first role, the connected USB-C under-test product supplies electric power to the circuit board, wherein if the USB-C transmission port connected with the USB-C under-test product is set as the second role, the circuit board or an external power source supplies electric power to the connected USB-C under-test product.

6. The product detection device according to claim 1, wherein all of the plural USB-C transmission ports are operable as the first role, and at least one of the plural USB-C transmission ports is also operable as the second role.

7. The product detection device according to claim 1, wherein the computing device is in communication with the at least one power detection instrument, so that a result of detecting the corresponding USB-C under-test product is transmitted from the power detection instrument to the computing device.

8. The product detection device according to claim 1, wherein the detection program issues the detection command according to a USB-C Power Delivery (PD) communication protocol.

9. The product detection device according to claim 1, wherein the plural designated voltages include 5V, 9V, 12V, 15V and 20V.

10. A product detection system for detecting at least one USB-C under-test product, the product detection system comprising:
a computing device, wherein a detection program is loaded in the computing device;
at least one power detection instrument; and
a product detection device comprising a circuit board, a processing unit, plural USB-C transmission ports and plural detection connection ports, wherein the processing unit is installed on the circuit board, the plural USB-C transmission ports are installed on the circuit board and connectable with the at least one USB-C under-test product, the plural detection connection ports are installed on the circuit board and connectable with the at least one power detection instrument, and the plural detection connection ports are correlated with the plural USB-C transmission ports,
wherein the detection program issues a detection command, and the USB-C transmission port connected with the USB-C under-test product is set as a first role or a second role, wherein the USB-C transmission port corresponding to the first role is cyclically operated at plural designated voltages under control of the processing unit, the processing unit issues an output voltage to the USB-C transmission port corresponding to the second role, and an operation status of the USB-C under-test product corresponding to the USB-C transmission port is detected by the connected power detection instrument.

11. A product detection method for use in a product detection system to detect at least one USB-C under-test product, the product detection system comprising a computing device, at least one power detection instrument and a product detection device, a detection program being loaded in the computing device, the product detection device comprising a processing unit, plural USB-C transmission ports and plural detection connection ports, the plural detection connection ports being correlated with the plural USB-C transmission ports, the product detection method comprising steps of:
connecting the at least one USB-C under-test product with the plural USB-C transmission ports, and connecting the at least one power detection instrument with the plural detection connection ports;
the detection program issuing a detection command;
the processing unit checking connection statuses of the plural USB-C transmission ports;
setting the USB-C transmission port that is connected with the USB-C under-test product as a first role or a second role;
the processing unit controlling the USB-C transmission port corresponding to the first role to be cyclically operated at plural designated voltages, and issuing an output voltage to the USB-C transmission port corresponding to the second role; and
the connected power detection instrument detecting an operation status of the USB-C under-test product corresponding to the USB-C transmission port.

12. The product detection method according to claim 11, wherein the product detection device further comprises plural Type-A transmission ports, and the product detection method further comprises a step of connecting at least one Type-A under-test product with the plural Type-A transmission ports, and connecting the at least one power detection instrument with the plural detection connection ports, wherein the plural detection connection ports are correlated with the plural USB-C transmission ports and the plural Type-A transmission ports.

13. The product detection method according to claim 11, wherein the product detection device further comprises a back-end connection interface, a manual operation module and a display module, wherein the back-end connection interface is connected with the computing device, a detection procedure is manually performed by a user through the manual operation module, and a detection result of using the manual operation module or a detection result in response to the detection command is shown and indicated on the display module.

14. The product detection method according to claim 11, wherein if the USB-C transmission port connected with the USB-C under-test product is set as the first role, the connected USB-C under-test product supplies electric power to the circuit board, wherein if the USB-C transmission port connected with the USB-C under-test product is set as the second role, the circuit board or an external power source supplies electric power to the connected USB-C under-test product.

15. The product detection method according to claim 11, wherein all of the plural USB-C transmission ports are operable as the first role, and at least one of the plural USB-C transmission ports is also operable as the second role.

16. The product detection method according to claim 11, further comprising steps of:
allowing the computing device to be in communication with the at least one power detection instrument; and
transmitting a result of detecting the corresponding USB-C under-test product from the power detection instrument to the computing device.

17. The product detection method according to claim 11, wherein the detection program issues the detection command according to a USB-C Power Delivery (PD) communication protocol.

18. The product detection method according to claim 11, wherein the plural designated voltages include 5V, 9V, 12V, 15V and 20V.

19. The product detection method according to claim 11, wherein the processing unit is equipped with a firmware component to execute the product detection method, or the product detection method is stored as an operation program code in a flash memory that is electrically connected with the processing unit.

20. The product detection method according to claim 12, further comprising steps of:
the processing unit checking connection statuses of the plural Type-A transmission ports; and
the connected power detection instrument detecting an operation status of the Type-A under-test product corresponding to the Type-A transmission port according to a USB battery charging (BC) specification.

* * * * *